(12) United States Patent
Meyer et al.

(10) Patent No.: US 8,618,027 B2
(45) Date of Patent: Dec. 31, 2013

(54) CORROSION INHIBITORS FOR OIL AND GAS APPLICATIONS

(75) Inventors: G. Richard Meyer, Missouri City, TX (US); Keith Allen Monk, League City, TX (US)

(73) Assignee: Nalco Company, Naperville, IL (US)

(*) Notice: Subject to any disclaimer, the term of this patent is extended or adjusted under 35 U.S.C. 154(b) by 303 days.

(21) Appl. No.: 12/963,036

(22) Filed: Dec. 8, 2010

(65) Prior Publication Data

US 2012/0149608 A1     Jun. 14, 2012

(51) Int. Cl.
*C10G 75/02* (2006.01)

(52) U.S. Cl.
USPC ........................................ 507/244; 166/305.1

(58) Field of Classification Search
None
See application file for complete search history.

(56) References Cited

U.S. PATENT DOCUMENTS

| | | | |
|---|---|---|---|
| 3,311,561 A * | 3/1967 | Campbell et al. | 252/75 |
| 3,959,158 A | 5/1976 | Stanford et al. | |
| 3,963,649 A * | 6/1976 | Spadini et al. | 510/236 |
| 4,321,166 A * | 3/1982 | McGrady | 510/335 |
| 4,964,468 A | 10/1990 | Adams et al. | |
| 5,854,145 A * | 12/1998 | Chandler et al. | 442/59 |
| 2009/0065736 A1 * | 3/2009 | Johnson et al. | 252/88.1 |

* cited by examiner

*Primary Examiner* — James J Seidleck
*Assistant Examiner* — Kumar Bhushan
(74) *Attorney, Agent, or Firm* — Edward O. Yonter; Andrew D. Sorensen

(57) ABSTRACT

A corrosion inhibitor composition and method of inhibiting corrosion on a surface in an oil or gas application is disclosed and claimed. The corrosion inhibitor includes at least one fatty acid; at least one alkanolamine; at least one alkylamine; and at least one organic sulfonic acid. The method of inhibiting corrosion includes on a surface in an oil or gas application comprises contacting an effective dosage of the corrosion inhibitor with the surface.

15 Claims, No Drawings

CORROSION INHIBITORS FOR OIL AND GAS APPLICATIONS

TECHNICAL FIELD OF THE INVENTION

This invention relates generally to corrosion inhibitors, corrosion inhibitor intermediates, and formulated products for oil and gas operations. More specifically, the invention relates to a mixture of amines and fatty acids for use in a corrosion inhibitor formulation in oil and gas applications.

BACKGROUND OF THE INVENTION

Oil wells and gas wells are typically subjected to numerous chemical treatments during their production life to enhance operation and protect asset integrity. Corrosion of metal surfaces due to aqueous or mixed media has long been a problem in the oil and gas industry. It is well known that during the production of oil and gas, corrosive agents such as brines, organic acids, carbon dioxide, hydrogen sulfide, solids, such as sand, and/or microorganisms, are present in production and downstream systems. These aggressive constituents can cause severe corrosion as evidenced by surface pitting, embrittlement, and general loss of metal. The metallic surfaces can be composed of high alloy steels including chrome steels, ferritic alloy steels, austenitic stainless steels, precipitation-hardened stainless steels, and high nickel content steels, but most often the less expensive carbon steels are utilized in combination with corrosion inhibitors or coatings. Corrosion problems are even more troublesome in deep-sea operations where replacement of corroded equipment is difficult and costly.

Therefore, it is common practice to employ corrosion inhibitors during the production, transportation, storage, and separation of crude oil and natural gas. Corrosion inhibitors are usually surface-active compounds that form protective films on the surface of the metal which comes in contact with corrosive environments thereby suppressing corrosion. Common corrosion inhibitors include amines and condensation products of fatty acids with polyamines (e.g., imidazolines, and/or quaternary ammonium compounds). Among the most frequently used corrosion inhibitors in crude oil and natural gas extraction are modified fatty acid derivatives and benzyldimethylalkylammonium chlorides. Many common oil-soluble corrosion inhibitors are also sometimes subject to raw material shortages and resulting increased production costs.

There thus exists an ongoing industrial need for improved corrosion inhibitors. Specifically, there is a need to develop less expensive, high performance corrosion inhibitors for oil and gas applications, including chemistries that may provide environmental benefits, health benefits (e.g., handling and manufacturing), manufacturing energy reduction, and reduction in waste generation.

BRIEF SUMMARY OF THE INVENTION

The present invention comprises a mixture of substituted amines and fatty acids for use in a corrosion inhibitor formulation in oil and gas applications. The mixture is derived from a reaction between a complex mixture of alkanolamines with various fatty acids. In an aspect, the general reaction neutralizes the raw materials forming a complex mixture of salts of the alkanolamines with the fatty acids.

In an aspect, the invention comprises a corrosion inhibitor including at least one fatty acid; at least one alkanolamine; optionally at least one alkylamine; and at least one organic sulfonic acid.

In another aspect, the invention comprises a method of inhibiting corrosion on a surface in an oil or gas application. In embodiments, the corrosion inhibitor of the invention is dosed into a backside of a well into an annulus of the well. The dosed corrosion inhibitor then travels into the well and returns with the produced fluids to avoid entering the formation. In other embodiments, the method includes contacting an effective dosage of the corrosion inhibitor of the invention with the surface. In embodiments, the method includes treating a subterranean formation penetrated by a wellbore comprising pumping through well tubular goods and injecting into the subterranean formation an effective dosage of the corrosion inhibitor of the invention to inhibit corrosion of metallic surfaces of the well tubular goods. It is an advantage of the invention to provide a more economical, efficient route to the active corrosion inhibitor in the product in the manufacturing process.

It is another advantage of the invention to provide increased partitioning effectiveness as determined by corrosion performance testing.

It is a further advantage of the invention to be utilized in the same manner as current chemistry in the art with equivalent physical properties and corrosion performance.

It is yet another advantage of the invention to utilize less specialized reactor types in the manufacturing process than the current chemistry in the art.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE INVENTION

The corrosion inhibitor composition of the invention is formed via reaction between a complex mixture of alkanolamines with various fatty acids. Laboratory and manufacturing procedures are described in the examples below. As an example, Product 4 (described below) is a complex mixture of salts which may generically be described as "amine salts of fatty acids."

As used herein, "corrosion inhibitor" is intended to refer to at least one of or any combination of the disclosed corrosion inhibitors, corrosion inhibitor intermediates, and corrosion inhibitor product formulations.

Various embodiments are herein described that contain individual components in each of the formulated corrosion inhibitors. Each variation is expected to produce a complex mixture of salts through reaction of the acids and amines from the raw materials. The raw materials have a variable composition and contain mixtures of homologs, varying degrees of saturation and unsaturation in the acids and ranges of actual concentrations of the amines used to produce the corrosion inhibitors.

In an embodiment, the corrosion inhibitor of the invention comprises a product of dimethylaminoethoxyethanol, dimethylethanolamine, tall oil, $C_{18}$-unsaturated fatty acid trimers, and branched dodecylbenzenesulfonic acid (DDBSA).

In another embodiment, the corrosion inhibitor of the invention comprises a product of tall oil, reaction products with 2-[2-(dimethylamino)ethoxy]ethanol, 2-(dimethylamino)ethanol, $C_{18}$-unsaturated fatty acid trimers, and branched DDBSA.

Representative alkanolamines include N,N-dimethylethanolamines, such as (N,N-dimethylaminoethoxy)ethanol; dimethylethanolamine; triethanolamine; methyldiethanolamine; ethanolamine; diethanolamine; other cyclic amines including morpholine, methylmorpholine, ethylmorpholine, piperidine, alkylpiperidines, piperazine, alkylpiperazines; ethyleneamines including DETA, TETA, TEPA, and the like; alkylamines including methylamine, dimethylamine, alkylmethylamines, dimethylalkylamines; methylaminopropylamine; dimethylaminopropylamine; dimethylaminoethylamine; methylaminoethylamine; the like; and combinations thereof.

Representative fatty acids include trimeric $C_{18}$ unsaturated fatty acid (e.g., CAS 68937-90-6), dimer acids, polymerized tall-oil fatty acids, one or more components of a crude tall oil composition, branched DDBSA, the like, and any combination of the foregoing. For example, a crude tall oil composition may include abietic acid; neoabietic acid; palustric acid; pimaric acid; dehydroabietic acid; palmitic acid; stearic acid; palmitoleic acid; linoleic acid; 5,9,12-octadecatrienoic acid; linolenic acid; 5,11,14-eicosadienoic acid; cis,cis-5,9-octadecadienoic acid; eicosadienoic acid; elaidic acid; cis-1,1-octadecanoic acid, $C_{20}$-$C_{24}$ saturated acids; the like; and any combination of the foregoing.

In an embodiment, the corrosion inhibitor composition of the invention includes the following formula (1) using dimethylalkanolamines with trimer acid [CAS 68937-90-6].

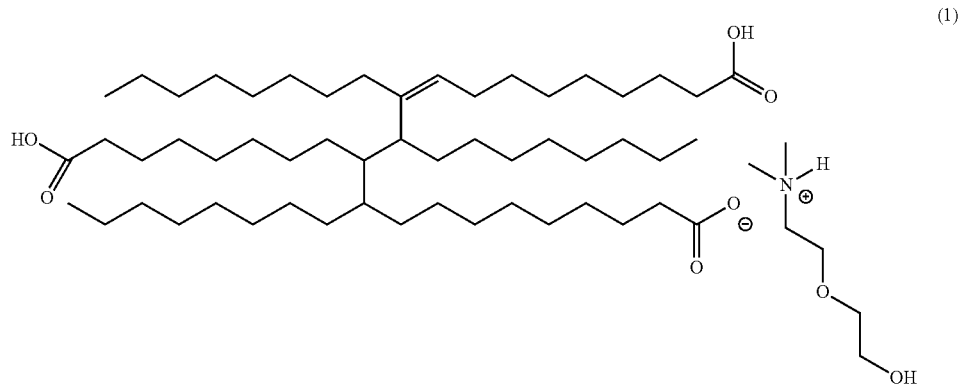

(1)

In an embodiment, the corrosion inhibitor composition of the invention includes the following formula (2) dimethylalkanolamines with trimer acid [CAS 68937-90-6].

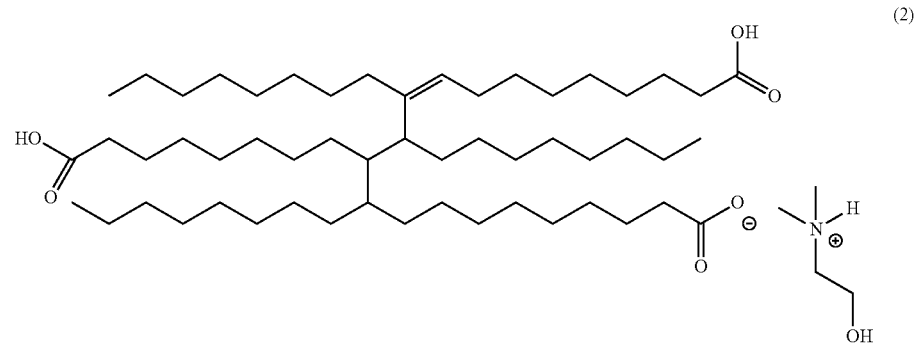

(2)

The above formulas (1) and (2), the representative acyclic trimer acid/amine salts which may be formed, for example, in the blending of trimer acid and a mixture of select alkanolamines. For simplicity of weight percentage composition, it has been assumed that the di- and tri-salts formed from two and three equivalents of amine, respectively, versus a single trimer molecule is negligible. Due to the complex mixture of species in trimer acid (i.e., cyclic trimers, aromatic trimers, polycyclic trimers, cyclic dimers, aromatic dimers, polycyclic dimers, and numerous isomeric species of the aforementioned chemicals) a representative acyclic structure of the acid is used. In addition, trimer acid contains variable percentages of dimers and trimers, adding to the complexity. A typical composition can include approximately 40% dimer and 60% trimer with insignificant percentages of the monomer.

In an embodiment, the corrosion inhibitor composition of the invention includes the following formula (3) using dimethylalkanolamines with tall oil [CAS 8002-26-4].

The structures below provide representative examples of the various acids present in this mixture.

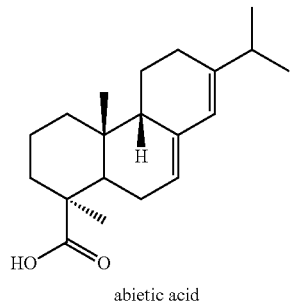
abietic acid

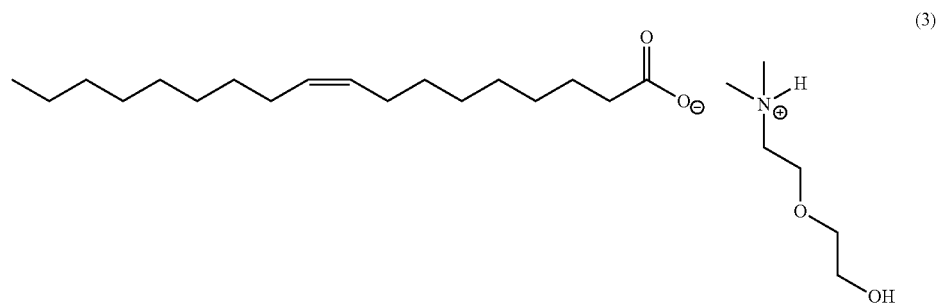
(3)

In an embodiment, the corrosion inhibitor composition of the invention includes the following formula (4) using dimethylalkanolamines with tall oil [CAS 8002-26-4].

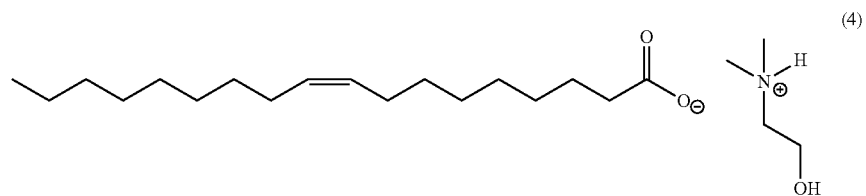
(4)

The second group of salts which can form in this blend is with tall oil, exemplified in formulas (3) and (4) above. Crude tall oil is, for example, a by-product of the pulp and paper industry and yields another complex mixture of fatty acids, rosin acids, and lesser amounts of terpenes and sterols. The composition of tall oil is variable with differences seen in regional sources and manufacturing processes as well as seasonal influences. Crude tall oil and distilled tall oil can also be very different. These differences are well known in the art. The structures above provide a representation of the salts formed from dimethylalkanolamines and tall oil (oleic acid is shown).

-continued

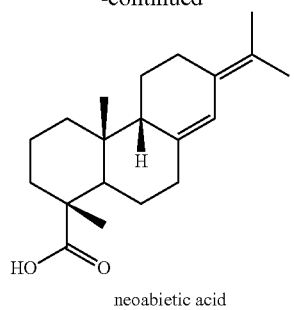
neoabietic acid

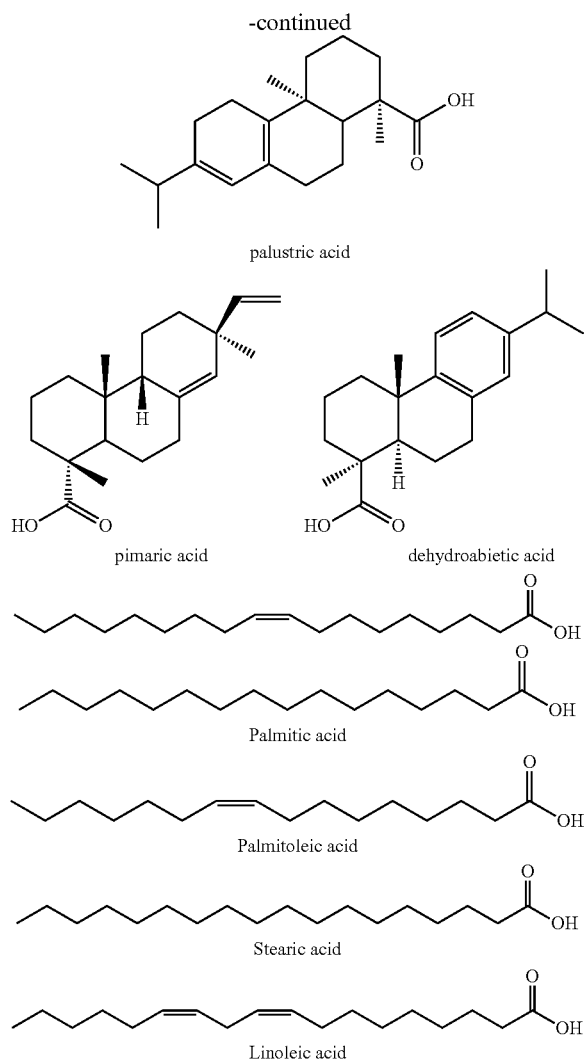

palustric acid pimaric acid dehydroabietic acid

Palmitic acid

Palmitoleic acid

Stearic acid

Linoleic acid

Other representative tall oil fatty acids include 5,9,12-octadecatrienoic acid; linolenic acid; 5,11,14-eicosatrienoic acid; cis,cis-5,9-octadecadienoic acid; eicosadienoic acid; elaidic acid; cis-11-octadecanoic acid; and $C_{20}$, $C_{22}$, $C_{24}$ saturated acids. Tall oil fatty acids may comprise any combination of the foregoing examples and others known in the art.

In an embodiment, the corrosion inhibitor composition of the invention includes the following formula (5) using dimethylalkanolamines with branched dodecylbenzene sulfonic acid [CAS 68411-32-5].

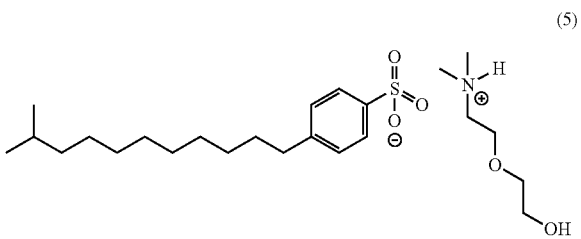

(5)

In an embodiment, the corrosion inhibitor composition of the invention includes the following formula (6) using dimethylalkanolamines with branched dodecylbenzene sulfonic acid [CAS 68411-32-5].

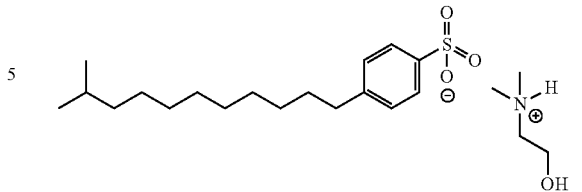

(6)

A representative structure of the salts formed with branched dodecylbenzene sulfonic acid (DDBSA) is shown above. The composition of these salts has been approximated based on general reactivity and percentages of each acid added to the blends.

In an embodiment, the product of the invention comprises about 10 wt % to about 100 wt % active ingredient. In another embodiment, the amount of active is from about 10 wt % to about 36 wt %. Preferably, the amount ranges from about 15 wt % to about 30 wt % active. In one embodiment, the product comprises about 27 wt % of the active.

In an embodiment, the corrosion inhibitor composition of the invention may include at least one solvent. Representative solvents include methanol, ethanol, propanol, isopropanol, butanol, isobutanol, aromatic hydrocarbons, isoparaffinic solvents, monoethyleneglycol, ethylene glycol monobutyl ether, the like, water (water can also be used to emulsify the corrosion inhibitor), and combinations thereof. A solvent component aids in corrosion inhibitor delivery and helps provide desirable secondary properties of the product, such as desired viscosity, temperature stability, and the like. In embodiments, the amount of solvent may range from about 8.5 wt % to about 90 wt %. In other embodiments, the amount of solvent may range from about 30 wt % to about 40 wt %.

In an embodiment, the corrosion inhibitor composition of the invention may include at least one dispersant. The dispersant is preferably an oxyalkylate polymer (i.e., polyoxyethylene) such as ethoxylated sorbitan monolaurate. This may include varying oxyalkylated sorbitan esters (e.g., mono, di-, and tri-esters) and non-oxyalkylated sorbitan esters as well. In embodiments, the amount of polyoxyalkylate can vary from about 1-2 mol % up to about 80 mol %, preferably 20 mol %. In embodiments, the amount of oxyalkylated sorbitan esters in the final product ranges from about 1 wt % to about 10 wt %, preferred about 1 wt % to about 5 wt %.

In another embodiment, the corrosion inhibitor composition of the invention further comprises at least one quaternary ammonium compound in the range of about 5-35 wt %, preferred about 5-20 wt %.

In another embodiment, the corrosion inhibitor composition of the invention includes at least one solvent and at least one dispersant.

The corrosion inhibitor products of the invention can be applied in the field via any suitable methodology. Commonly used methods include continuous injection or batch treating. Continuous injection may be performed where appropriate chemical injection equipment is available in the field along with chemical storage tanks, otherwise the chemical may be treated using a specialized treatment vehicle which applies a large chemical dosage at long time intervals, usually every one to two weeks and in certain cases, monthly.

Batch application may be performed through the use of a treating truck comprising a storage tank containing the corrosion inhibitor (and optionally other chemicals) and a large water tank. The treating truck travels to field locations and treats individual wells through a process such as that disclosed in U.S. Pat. No. 4,964,468, "Method of Inhibiting Corrosion." The chemical is applied into the well bore (typically downhole), usually down the annulus, utilizing this special application process. The inhibitor protects the metal surface of the production tubing ensuring continued production and asset integrity.

In an embodiment, the corrosion inhibitor of the invention is dosed into a backside of a well into an annulus of the well. The dosed corrosion inhibitor then travels into the well and returns with the produced fluids to avoid entering the formation.

In other embodiments, the corrosion inhibitor composition is used to treat a subterranean formation penetrated by a wellbore comprising pumping through well tubular goods and injecting into the subterranean formation an effective dosage of the corrosion inhibitor to inhibit corrosion of metallic surfaces of the well tubular goods in contact with the corrosion inhibitor composition.

The foregoing may be better understood by reference to the following examples, which are intended for illustrative purposes and are not intended to limit the scope of the invention.

EXAMPLE 1

Synthesis of Product 1

To a 1-L round bottom flask was added 15.53 g of trimeric $C_{18}$ unsaturated fatty acid (dimer-trimer acid, [CAS 68937-90-6]) and 298.6 g of crude tall oil [CAS 8002-26-4. The flask was fitted with a thermocouple/temperature controller and overhead stirrer. The contents of the vessel were stirred and a mixture of N,N-dimethylethanolamines (50.07 g, [CAS 108-01-0], [CAS 1704-62-7]—these components are added simultaneously to the flask drop-wise over a 20-minute period. The reaction was exothermic and the temperature increased with addition (total 15° C.). The reaction was stirred for two hours with no heating, and the temperature was seen to decrease with time. Heavy aromatic naphtha (95.81 g, [CAS 64742-94-5]) was added followed by branched dodecylbenzene sulfonic acid (76.8 g, [CAS 68411-32-5]). The addition of DDBSA was also exothermic and a temperature increase from 30.4° C. to 42° C. was noted. The contents were stirred for approximately 5 minutes and trimer acid (231.72 g, [CAS 68937-90-6]) and isopropyl alcohol (95.8 g, [CAS 67-63-0]) were added. The corrosion inhibitor was stirred for 1 hour prior to storage. The composition of Product 1 is summarized in Table 1.

TABLE 1

| Component/CASRN | Generic Description | Typical Wt % |
| --- | --- | --- |
| 1. Fatty acids, $C_{18}$-unsatd., trimers [FAT, 68937-90-6] | Fatty acid | 1.8 |
| 2. Tall oil [TO, 8002-26-4] | Fatty acid | 34.6 |
| 3. 2-[2-(Dimethylamino)ethoxy]ethanol [DMAEE, 1704-62-7] | Alkanolamine | 3.48-4.64 |
| 4. Dimethylaminoethanol [DMAE, 108-01-0] | Substituted alkylamine | 0.87-1.74 |
| 5. Heavy aromatic naphtha [64742-94-5] | Aliphatic hydrocarbon | 11.1 |
| 6. Branched dodecylbenzenesulfonic acid [BDDBSA, 68411-32-5] | Organic sulfonic acid | 8.8 |
| 7. Fatty acids, $C_{18}$-unsatd., trimers [68937-90-6] | Fatty acid | 26.8 |
| 8. Isopropyl alcohol [67-63-0] | isopropanol | 11.1 |

EXAMPLE 2

Synthesis of Product 2

To a 1-L round bottom flask was added 28.43 g of trimeric $C_{18}$ unsaturated fatty acid (dimer-trimer acid, [CAS 68937-90-6] and 536.21 g of crude tall oil [CAS 8002-26-4]. The flask was fitted with a thermocouple/temperature controller and overhead stirrer. The contents of the vessel were stirred and a mixture of N,N-dimethylethanolamines (90.20 g, [CAS 108-01-0], [CAS 1704-62-7] are added simultaneously to the flask dropwise over a 20-minute period. The reaction was exothermic and the temperature increased with addition (total 13° C.). The reaction was stirred for one hour with no heating, and the temperature was seen to decrease with time. Isobutyl alcohol (157.71 g, [CAS 78-83-1]) was added and the mixture stirred for 1 hour prior to storage. The composition of Product 2 is summarized in Table 2.

TABLE 2

| Component/CASRN | Generic Description | Typical Wt % |
| --- | --- | --- |
| 1. Fatty acids, $C_{18}$-unsatd., trimers [FAT, 68937-90-6] | Fatty acid | 3.5 |
| 2. Tall oil [TO, 8002-26-4] | Fatty acid | 66.0 |
| 3. 2-[2-(Dimethylamino)ethoxy]ethanol [DMAEE, 1704-62-7] | Alkanolamine | 6.66-8.88 |
| 4. Dimethylaminoethanol [DMAE, 108-01-0] | Substituted alkylamine | 1.67-3.33 |
| 5. Isobutyl alcohol [78-83-1] | Isobutanol | 19.4 |

EXAMPLE 3

Synthesis of Product 3

Synthesis of Product 3 begins with an alternate synthesis of Product 2. The 1-L round bottom flask was also fitted with a thermocouple/temperature controller and overhead stirrer. To a 1-L round bottom flask was added 13.7 g of trimeric $C_{18}$ unsaturated fatty acid (dimer-trimer acid, [CAS 68937-90-6] and 259.3 g of crude tall oil [CAS 8002-26-4]. The flask was fitted with a thermocouple/temperature controller and overhead stirrer. The contents of the vessel were stirred and N,N-dimethylethanolamines (43.7 g, [CAS 108-01-0, CAS 1704-62-7] are added simultaneously to the flask dropwise over a 20-minute period. The reaction was exothermic and the temperature increased with addition (total 11° C.). The mixture was stirred for one hour with no heating, and the temperature was seen to decrease with time. Isobutyl alcohol (75.8 g, [CAS 78-83-1]) was added and the mixture stirred for 1 hour. To 392.5 g of this alternative form of Product 2 was added DDBSA (61.5 g, [CAS 68411-32-5]). The reaction was exothermic and the temperature increased 11° C. following addition. Stirred for 15 minutes with no heating and trimer acid (202.6 g, [CAS 68937-90-6]) was added. Temperature was seen to decrease during this time. Ethoxylated sorbitan monolaurate (17.16 g, [CAS 9005-64-5]) was added and the mixture stirred for 15 minutes before the addition of xylene/ethyl benzene (134.5 g, [CAS 1330-20-7/100-41-4]) and isopropyl alcohol (90.1 g, [CAS 67-63-0]). The corrosion inhibitor was stirred for 30 minutes prior to storage.

TABLE 3

| Component/CASRN | Generic Description | Typical Wt % |
|---|---|---|
| 1. Fatty acids, $C_{18}$-unsatd., trimers [FAT, 68937-90-6] | Fatty acid | 1.5 |
| 2. Tall oil [TO, 8002-26-4] | Fatty acid | 28.9 |
| 3. 2-[2-(Dimethylamino)ethoxy]ethanol [DMAEE, 1704-62-7] | Alkanolamine | 2.88-3.84 |
| 4. Dimethylaminoethanol [DMAE, 108-01-0] | Substituted alkylamine | 0.72-1.44 |
| 5. Isobutyl alcohol [78-83-1] | Isobutanol | 8.5 |
| 6. Branched dodecylbenzenesulfonic acid [BDDBSA, 68411-32-5] | Organic sulfonic acid | 6.8 |
| 7. Fatty acids, $C_{18}$-unsatd., trimers [68937-90-6] | Fatty acid | 22.6 |
| 8. Ethoxylated sorbitan monolaurate [9005-64-5] | Oxyalkylate polymer | 1.9 |
| 9. Xylene/Ethyl benzene [1330-20-7/100-41-4] | Aromatic hydrocarbon | 15.0 |
| 10. Isopropyl alcohol [67-63-0] | Isopropanol | 10.0 |

Corrosion inhibitor products used in batch application are generally produced using high temperature reactions (e.g., condensation products of amines and fatty acids yielding polyamides). The chemistry of this invention is much different and unexpected in that it shows equivalent performance without the need for high temperature reaction conditions.

EXAMPLE 4

Manufacturing Procedure for Product 4

In a clean 4,000 gallon blender equipped with an agitator the ingredients (1)

Product 3 (27% actives as charged), (2) thioglycolic acid [CAS 68-11-1], and (3) mixed alkyl dimethylbenzylammonium chlorides in methanol [CAS 139-07-1], [CAS 139-08-2], [CAS 122-18-9], [CAS 122-19-0], and [CAS 67-56-1] were charged along with heavy aromatic naptha solvent [CAS 64742-94-5]. After charging the ingredients, the vessel contents were blended for approximately 6 hours. Prior to packaging/transfer an 8 ounce sample was taken for QA.

Typical amounts of the aforementioned components comprise 8,625 kg Product 3 (containing 27% PMN substance); 103.5 kg thioglycolic acid [CAS #68-11-1]; 1,297.2 kg mixed alkyl dimethylbenzylammonium chlorides [CAS#s 139-07-1, 139-08-2, 122-18-9, 122-19-0] in methanol [CAS #67-56-1]; and 1,474.3 kg heavy aromatic naphtha [CAS #64742-94-5].

From the blending vessel the product will be either transferred to a holding tank and then packaged or packaged directly from the blending vessel. After the batch was complete, Product 3 was transferred to a holding tank (size 4,000-15,000 gallons). The packaging was performed over a period of approximately 3 hours.

EXAMPLE 5

Comparative Wheel Box Test

Corrosion reduction performance of two compositions of the invention was evaluated in a number of laboratory tests simulating various field conditions. Two formulations, indicated as Product 3 and Product 4 were evaluated. A wheel box test was utilized to determine if these formulations were effective at protecting a water-wet surface under sweet ($CO_2$) conditions. A bubble test was utilized to assess the partitioning capability of the formulations under low flow conditions.

Rotating cylinder autoclaves and jet impingement were used to evaluate the formulations under high shear at elevated temperature and pressure. The experimental design described determined if the formulations were able to reach the inner wall surface of the pipe via the water-phase and their effectiveness at protecting the pipe wall under high-shear conditions.

In the wheel box tests below, wheel box testing methodology from NACE publication ID182 (December 1982) was used. The wheel box test is a test that is often used in the field of corrosion to compare the performance of one corrosion inhibitor to another. To test corrosion inhibitor performance the following standard set of conditions was used.

| | |
|---|---|
| Temperature | 176° F. |
| Oil type | 10% LVT-200 |
| Brine | 90% ASTM Seawater brine |
| $CO_2$ level | Saturated |
| Duration | 24 hours |

A continuous wheel box test procedure was used to compare the performance of the corrosion inhibitor formulations of the invention in mitigating the corrosion of carbon steel under sweet conditions ($CO_2$). Clean and pre-weighed coupons were placed in bottles containing the desired brine and oil mixtures, purged with carbon dioxide, and then dosed with the various concentrations of the formulations as indicated in Tables 4A and 4B. The air space in the bottles was purged with carbon dioxide and the bottles were immediately sealed to prevent exposure to air. Blanks (bottles containing no corrosion inhibitor) were used to identify the corrosion rate under the test conditions, as well as provide a comparison to the inhibitors at the respective concentrations. The complete set of bottles was placed on a rotating wheel and the test was run for the specified time period at temperatures up to 80° C. At the conclusion of the test, the bottles were removed and cooled to room temperature. The coupons were removed, cleaned, dried, and re-weighed. The corrosion rate and protection efficiency was calculated by comparison of the mass loss of the inhibited coupons to the blanks.

TABLE 4A

| Example | Concentration, ppm | % Protection |
|---|---|---|
| Incumbent Product | 10 | 64 |
| | 25 | 96 |
| | 50 | 97 |
| | 100 | 98 |
| Product 3 | 10 | 94 |
| | 25 | 96 |
| | 50 | 96 |
| | 100 | 97 |
| Product 3 | 10 | 81 |
| | 25 | 96 |
| | 50 | 97 |
| | 100 | 97 |
| Product 3 | 10 | 82 |
| | 25 | 96 |
| | 50 | 96 |
| | 100 | 97 |

TABLE 4B

| Example | Concentration, ppm | % Protection |
|---|---|---|
| Incumbent Product | 10 | 95 |
|  | 25 | 99 |
|  | 50 | 99 |
|  | 100 | 99 |
| Product 4 | 10 | 84 |
|  | 25 | 98 |
|  | 50 | 98 |
|  | 100 | 99 |

A film persistency wheel box test was performed in three stages: filming, rinsing, and exposure. The test simulated the capability of the inhibitor to film a metal surface at the various concentrations shown in Tables 5A and 5B using a pre-determined filming time and remain as a persistent film on the surface of the metal during a wash phase with fresh oil and brine. During the final stage of the test, the corrosion coupons were again exposed to fresh brine and oil over a 24-hour period. Mass loss of the coupons was determined, and the corrosion inhibitor performances were compared to a standard (i.e., blank sample with no added corrosion inhibitor).

TABLE 5A

| Example | Concentration, ppm | % Protection |
|---|---|---|
| Incumbent Active | 2,000 | 92 |
|  | 3,000 | 95 |
|  | 4,000 | 93 |
|  | 5,000 | 94 |
| Product 3 | 2,000 | 95 |
|  | 3,000 | 93 |
|  | 4,000 | 93 |
|  | 5,000 | 94 |
| Product 3 | 2,000 | 95 |
|  | 3,000 | 94 |
|  | 4,000 | 94 |
|  | 5,000 | 94 |
| Product 3 | 2,000 | 88 |
|  | 3,000 | 94 |
|  | 4,000 | 92 |
|  | 5,000 | 92 |

TABLE 5B

| Example | Concentration, ppm | % Protection |
|---|---|---|
| Incumbent Product | 2,000 | 98 |
|  | 3,000 | 98 |
|  | 4,000 | 98 |
|  | 5,000 | 98 |
| Product 4 | 2,000 | 98 |
|  | 3,000 | 98 |
|  | 4,000 | 97 |
|  | 5,000 | 97 |

EXAMPLE 6

Comparative Bubble Test

The bubble test (sometimes referred to as a kettle test) was used to evaluate the partitioning properties of the formulations of the invention. In this context, partitioning properties refers to how quickly and to what extent chemicals will enter the water phase under stagnant conditions in a multiphase system, which is indicative of the water solubility of those chemicals. With respect to the field conditions, this laboratory test design simulates low flow areas, such as dead legs and water traps where no or very limited mixing exists. The performance of tested corrosion inhibitors was determined by their capability to partition into the water phase after the inhibitor was dosed into the hydrocarbon phase.

In a typical experiment, the brine of interest was added to a specifically designed kettle and stirring was commenced at 100 rpm using a magnetic stir bar. The brine was then purged with $CO_2$ and heated to 50-80° C. using a hot plate with thermostatic control to maintain the temperature within ±1° C. The corrosion rate was measured using linear polarization resistance (LPR) to obtain the polarization resistance ($R_p$) through the utilization of three electrodes: (i) counter (stainless steel), (ii) reference (stainless steel), and (iii) working (carbon steel). The electrodes were conditioned before the test by acid washing to minimize data variability and enhance reproducibility. Purging was continued as the probe was immersed into the brine solution and oil was carefully introduced on top of the brine. Data acquisition software was used to convert the data obtained to a corrosion rate in mils per year (mpy). The system was allowed to reach equilibrium over a 2-4 hour period in which the uninhibited corrosion rate baseline was established. The three-way valve controlling the $CO_2$ purge was then switched to blanket the liquids and flow through the headspace of the kettles without disturbing the partitioning between the oil and water phases. The corrosion inhibitor was then injected into the hydrocarbon phase. Partitioning occurred as the corrosion inhibitor migrated through the hydrocarbon phase into the brine solution. The effectiveness of the inhibitor was then correlated to the partitioning into the aqueous phase and interaction with the electrodes of the LPR probe. The test was monitored continuously over a specified period of time, and indication of the partitioning of the inhibitor into the brine resulted in a significant reduction in the corrosion rate. Results are shown in Tables 6A to 6D.

The tests were completed under field-like conditions using crude oil and synthetic brines based upon field information and under the following conditions. The corrosion inhibitor dosage was 25 ppm actives based on total liquid volume.

| Temperature | 55° F. |
|---|---|
| Oil type | Crude |
| Brine | Variable |
| $CO_2$ level | Saturated |
| Duration | 24 hours |

TABLE 6A

| | | | 2 hrs after dosing | | 8 hrs after dosing | | 21 hrs after dosing | |
|---|---|---|---|---|---|---|---|---|
| Chemical | Dosage (ppm) | Baseline (mpy) | mpy | % Protection | mpy | % Protection | mpy | % Protection |
| Product 4 | 25 | 129.8 | 8.5 | 93.4 | 4.2 | 96.8 | 2.7 | 98.0 |
| Incumbent Product | 25 | 123.7 | 32.2 | 74.0 | 7.3 | 94.1 | 3.9 | 96.8 |

TABLE 6B

| Chemical | Dosage (ppm) | Baseline (mpy) | 2 hrs after dosing | | 8 hrs after dosing | | 21 hrs after dosing | |
|---|---|---|---|---|---|---|---|---|
| | | | mpy | % Protection | mpy | % Protection | mpy | % Protection |
| Product 4 | 25 | 143.4 | 13.9 | 90.3 | 2.3 | 98.4 | 0.7 | 99.5 |
| Incumbent Product | 25 | 145.4 | 83.3 | 42.7 | 41.1 | 71.7 | 27.9 | 80.8 |

TABLE 6C

| Chemical | Dosage (ppm) | Baseline (mpy) | 2 hrs after dosing | | 8 hrs after dosing | | 19 hrs after dosing | |
|---|---|---|---|---|---|---|---|---|
| | | | mpy | % Protection | mpy | % Protection | mpy | % Protection |
| Product 4 | 25 | 92.7 | 2.7 | 97.1 | 1.5 | 98.4 | 1.3 | 98.6 |
| Incumbent Product | 25 | 99.8 | 7.0 | 93.0 | 4.0 | 96.0 | 3.2 | 96.8 |

TABLE 6D

Film Persistency

| Chemical | Dosage (ppm) | Baseline (mpy) | 2 hrs after dosing | | 8 hrs after dosing | | 62.5 hrs after dosing | |
|---|---|---|---|---|---|---|---|---|
| | | | mpy | % Protection | mpy | % Protection | mpy | % Protection |
| Product 4 | 25 | 139.3 | 1.2 | 99.1 | 1.8 | 98.7 | 0.6 | 99.6 |
| Incumbent Product | 25 | 146.6 | 3.1 | 97.9 | 13.7 | 90.7 | 29.3 | 80.0 |

EXAMPLE 7

Comparative Rotating Cylinder Autoclave Test (RCA)

The RCA is a mass loss test. Specimens of carbon steel (C1018) were used for each experimental run, separated by 4 Hastelloy coupons. Before each test, the specimens were cleaned ultrasonically with toluene and then in two successive batches of acetone. Each specimen was then measured using a caliper and weighed to the nearest 0.1 mg. The testing procedure consisted of filling an autoclave with brine, oil (if applicable), and the appropriate dosage of corrosion inhibitor. The purging of the autoclave consisted of bubbling $CO_2$ continuously into the solution for two hours. The specimens were mounted on a rotating cage connected to a shaft inside of an autoclave. The headspace left for each autoclave was about 0.2 liter. After purging, a desired pressure of $CO_2$ was topped by nitrogen up to the total test pressure. The stirrer was started to achieve a predetermined rotation corresponding to a desired wall shear stress. The temperature was then raised gradually to the test temperature. Throughout the test, the temperature of the solution was monitored and controlled through thermocouples and temperature controllers.

After each test, the specimens were rinsed with acetone, and then weighed to the nearest 0.1 mg to determine the weight after test and before cleaning. They were next cleaned in inhibited hydrochloric acid, rinsed with distilled water and acetone, weighed again to the nearest 0.1 mg and corrosion rates were calculated. The testing conditions are shown below and the results are shown in Table 7.

| Test Variables | Value |
|---|---|
| Brine | Synthetic (35,000 TDS) |
| Crude | none |
| Acetic Acid | 500 ppm |
| Test Temperature | 250° F. (121° C.) |
| Gas Composition | 100 psi $CO_2$ |
| | 150 psi $N_2$ |
| Total Pressure | 250 psi |
| Inhibitor Dosage | 200 ppm |
| Duration | 72 hours |
| Shear Rate | 550 Pa |
| Metal | C1018 |

TABLE 7

| Sample | Dosage | Mass Loss (mg) | % Protection | C.R. (mpy) |
|---|---|---|---|---|
| Blank | 0 | 5012.60 | NA | 1110.13 |
| Blank | 0 | 4545.40 | NA | 1007.41 |
| Blank | 0 | 4384.60 | NA | 971.94 |
| Blank | 0 | 3717.80 | NA | 825.65 |
| Average | NA | 4415.10 | NA | 978.78 |
| STDEV | NA | 535.77 | NA | 117.71 |
| % RSD | NA | 12.13% | NA | 12.03% |
| Incumbent Product | 200 | 97.00 | 97.8 | 21.52 |
| Incumbent Product | 200 | 137.90 | 96.9 | 30.62 |
| Incumbent Product | 200 | 125.70 | 97.1 | 27.90 |
| Incumbent Product | 200 | 131.40 | 97.2 | 29.18 |
| Average | NA | 123.00 | 97.2 | 27.30 |
| STDEV | NA | 18.04 | 0.4 | 4.01 |
| % RSD | NA | 14.66% | 0.40% | 14.69% |
| Product 4 | 200 | 70.30 | 98.4 | 15.60 |
| Product 4 | 200 | 100.00 | 97.7 | 22.21 |

TABLE 7-continued

| Sample | Dosage | Mass Loss (mg) | % Protection | C.R. (mpy) |
|---|---|---|---|---|
| Product 4 | 200 | 94.10 | 97.9 | 20.94 |
| Product 4 | 200 | 83.50 | 98.1 | 18.58 |
| Average | NA | 86.97 | 98.0 | 19.33 |
| STDEV | NA | 13.05 | 0.3 | 2.91 |
| % RSD | NA | 15.00% | 0.30% | 15.05% |

EXAMPLE 8

Jet Impingement Test

When run under typical conditions, the jet impingement apparatus allows simulation of up to 1000 Pa of wall shear stress. In this example, a 55-gallon tank containing brine was sparged with $CO_2$ and heated overnight to de-aerate the solution and reach a required testing temperature. The brine was pumped at a flow rate corresponding to a required shear stress. Synthetic oil (LVT-200) can be injected into the system, however at low dosage. The corrosion rate values were monitored over a series of time periods: (i) pre-corrosion stage (10 min), (ii) inhibitor dosage (10 min), and (iii) following inhibitor injection (20 min). The protection efficiency was obtained by comparing the uninhibited baseline with the average inhibited corrosion rate. A desired concentration of a corrosion inhibitor was dosed by HPLC pump. There was no accumulation of corrosion products or any reaction by-products and the conditions mimicked a real system more closely than, for example, a closed flow loop system. In addition, the flow-through design provided specific information about the film persistency properties of the tested products, by evaluating/comparing the "tail" section of the corrosion rate profile after the inhibitor injection was stopped. A corrosion inhibitor was dosed using an HPLC pump, typically at concentrations between 50 and 150 ppm. The following table gives the conditions employed in the testing. Experimental results are shown in Table 8.

| Test Variables | Value |
|---|---|
| Oil | LVT-200 (1,000 ppm) |
| Brine | Synthetic (35,000 ppm) |
| Acetic Acid | 500 ppm |
| Test Temperature | 131° F. (55° C.) |
| Inhibitor Dosage | 100 ppm |
| Duration | 40 minutes |
| | 10 min. baseline |
| | 10 min. dosing |
| Flow Rate | 1 L/min |
| Shear Rate | 1000 Pa |
| Metal | C1018 |

EXAMPLE 9

Field Test

Coupons were placed in two wells. The wells were historically treated with a single corrosion inhibitor product, described in the testing data tables as "incumbent product." The coupons were left in both wells for four weeks. Each well received four treatments with the new chemical, Product 4. The coupons were located at the wellhead in a coupon loop configuration. The incumbent average weight loss listed below was collected by averaging the last two years of coupon data. These coupons had an average exposure time of 90 days. The coupons were exposed for 23 days with Product 4 treatments. Data from this evaluation suggests that the new product is equivalent in performance to the incumbent active.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

TABLE 8

| Chemical | Dosage (ppm) | Baseline (mpy) | 2 min after dosing | | 12 minutes after dosing | | end of test | |
|---|---|---|---|---|---|---|---|---|
| | | | mpy | % Protection | mpy | % Protection | mpy | % Protection |
| Incumbent Product | 100 | 2296.9 | 54.2 | 97.6 | 157.8 | 93.1 | 667.7 | 70.9 |
| Incumbent Product | 100 | 2439.9 | 96.6 | 96.0 | 163.0 | 93.3 | 570.5 | 76.6 |
| Product 4 | 100 | 2256.6 | 81.2 | 96.4 | 84.6 | 96.3 | 273.3 | 87.9 |
| Product 4 | 100 | 1899.1 | 49.7 | 97.4 | 38.2 | 98.0 | 52.3 | 97.2 |

The claimed invention is:

1. A corrosion inhibitor composition comprising:
a salt having formula (2):

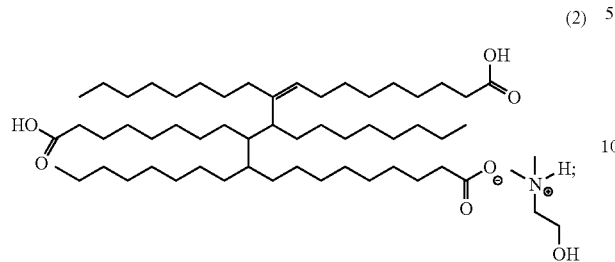

optionally at least one alkylamine; and
a salt having formula (6):

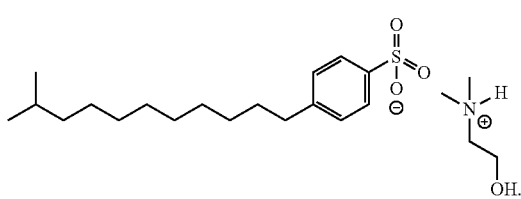

2. The corrosion inhibitor of claim 1, further comprising at least one dispersant.

3. The corrosion inhibitor of claim 2, wherein the at least one dispersant comprises at least one oxyalkylate polymer.

4. The corrosion inhibitor of claim 1, further comprising at least one solvent.

5. The corrosion inhibitor of claim. 4, wherein the at least one solvent comprises at least one selected from methanol, ethanol, propanol, isopropanol, butanol, isobutanol, aromatic hydrocarbons, monoethyleneglycol, ethyleneglycolmonobutylether, and combinations thereof.

6. The corrosion inhibitor of claim 1, comprising the following formula (1) using dimethylalkanolamines with trimer acid:

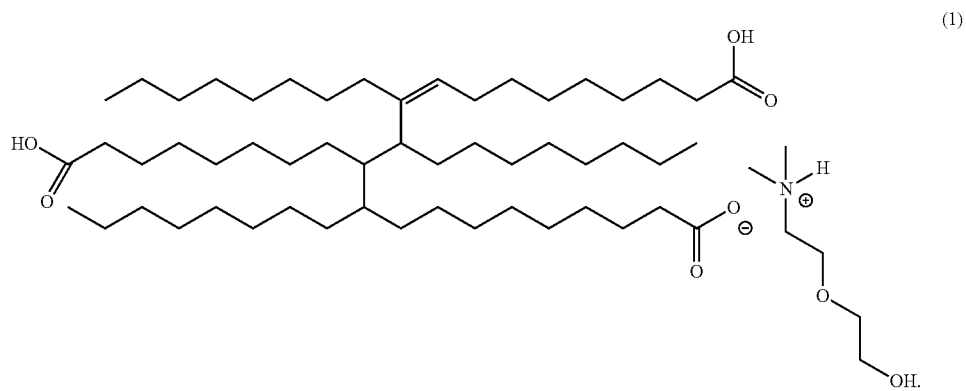

7. The corrosion inhibitor of claim 1, comprising the following formula (3) using dimethylalkanolamines with tall oil:

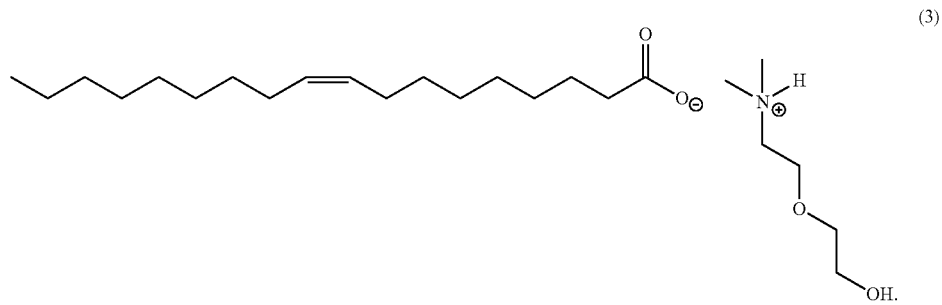

8. The corrosion inhibitor composition of claim 1, comprising the following formula (4) using dimethylalkanolamines with tall oil:

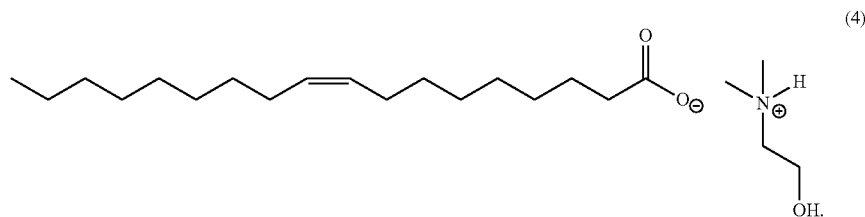

9. The corrosion inhibitor composition of claim 1, comprising the following formula (5) using dimethylalkanolamines with branched dodecylbenzene sulfonic acid:

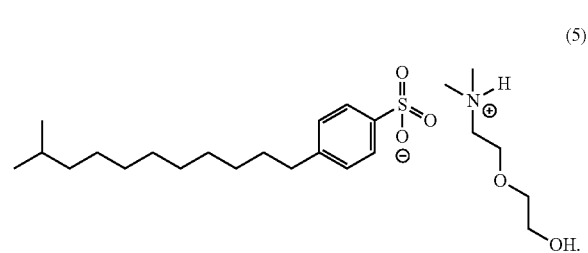

10. The corrosion inhibitor composition of claim 1, comprising about 10 wt % to about 100 wt % of corrosion inhibitor actives.

11. A method of inhibiting corrosion on a surface in an oil or gas application, the method comprising contacting an effective dosage of the corrosion inhibitor of claim 1 with the surface.

12. The method of claim 11, wherein the effective dosage range is between about 10 ppm to about 10,000 ppm.

13. The method of claim 11, further comprising dosing the corrosion inhibitor into an annulus of a well; allowing the dosed corrosion inhibitor to navels into the well; and recovering the corrosion inhibitor with a produced fluid thereby avoiding entering a formation.

14. The method of claim 11, further comprising treating a subterranean formation penetrated by a wellbore comprising pumping through well tubular goods and injecting into the subterranean formation the effective dosage of said corrosion inhibitor to inhibit corrosion of metallic surfaces of said well tubular goods in contact with said composition.

15. The composition of claim 1, further comprising:
a salt having formula (1):

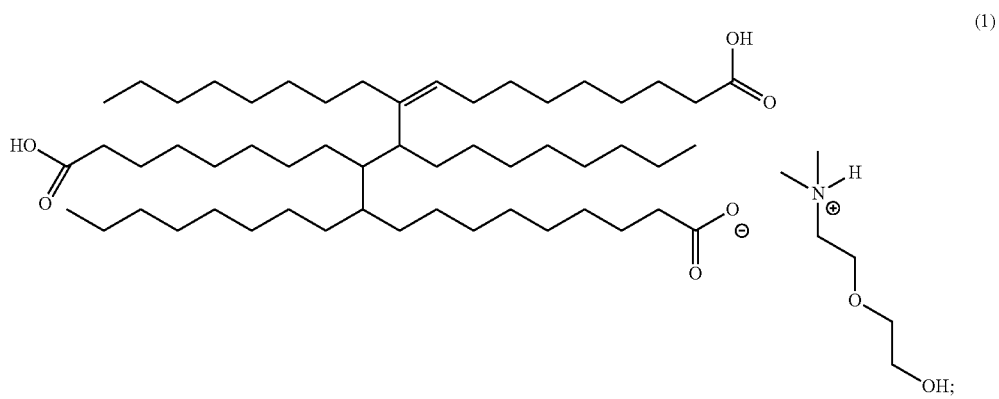

a salt having formula (3):
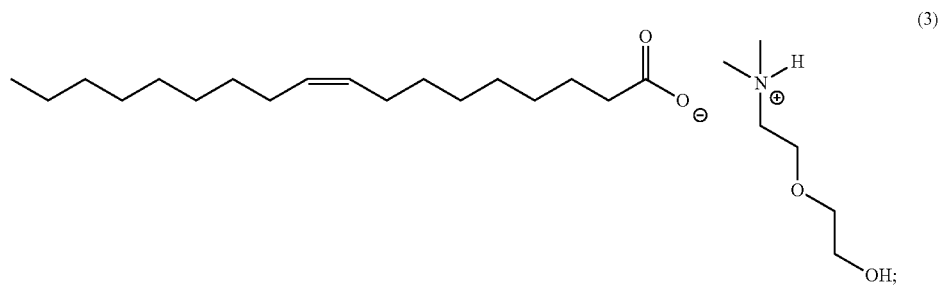
a salt having formula (4):
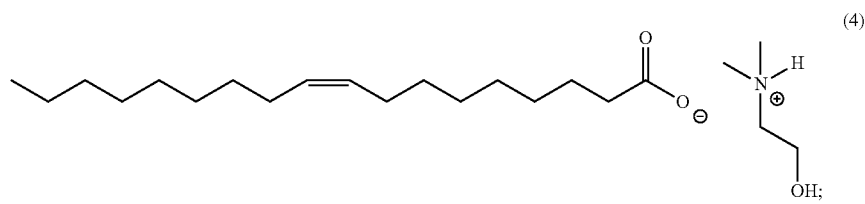
a Salt having formula (5):
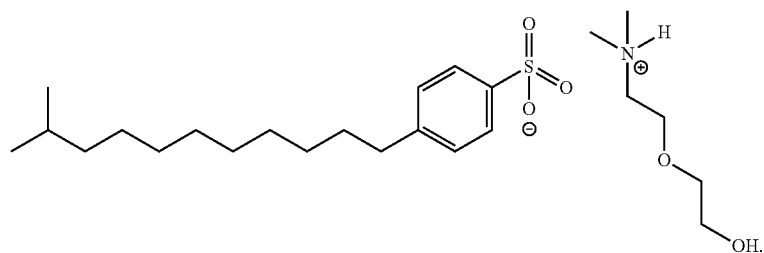
* * * * *